United States Patent [19]

Ellis et al.

[11] 3,794,738

[45] Feb. 26, 1974

[54] SODIUM DITHIONITE STABILIZATION AGAINST SELF-IGNITION

[75] Inventors: Leonard C. Ellis, Chesapeake; Mearl A. Kise, Portsmouth, both of Va.

[73] Assignee: Virginia Chemicals Inc., Portsmouth, Va.

[22] Filed: July 26, 1972

[21] Appl. No.: 275,448

[52] U.S. Cl.............. 423/515, 252/105, 252/188, 8/110
[51] Int. Cl............................................ C01b 17/98
[58] Field of Search.. 252/188, 105; 423/515; 8/110

[56] References Cited
UNITED STATES PATENTS

| | | | |
|---|---|---|---|
| 2,516,321 | 7/1950 | Hurd et al. | 252/188 |
| 3,054,658 | 9/1962 | Franklin et al. | 252/188 |
| 3,353,909 | 11/1967 | Janson et al. | 423/515 |
| 3,433,590 | 3/1969 | van Damme-van Weele | 252/188 |
| 3,468,623 | 9/1969 | van Damme-van Weele | 252/188 |
| 3,645,665 | 2/1972 | Etters | 252/188 |
| 3,672,829 | 6/1972 | Kise et al. | 252/188 |

*Primary Examiner*—Carl D. Quarforth
*Assistant Examiner*—Irwin Gluck
*Attorney, Agent, or Firm*—J. Gibson Semmes

[57] ABSTRACT

To retard self-ignition of commercial grades of sodium dithionite when contacted with moisture and/or water, small but effective amounts of low concentration alkali metal and ammonium salts of diglycolic acid are added, said additive salts being beneficial to bleaching processes in which sodium dithionite may be used, while at the same time avoiding eutrophication of lakes and streams into which the bleaching effluent may ultimately flow.

14 Claims, No Drawings

3,794,738

SODIUM DITHIONITE STABILIZATION AGAINST SELF-IGNITION

BACKGROUND OF INVENTION

Under normal storage conditions, commercial grades of sodium dithionite can be held without appreciable decomposition for several years, if kept dry. There have been reports, however, of instances where sodium dithionite in storage has spontaneously "ignited," i.e., decomposed with heat, resulting in considerable damage. As the result of such ignition, copious volumes of noxious sulfurous gases are evolved.

It is a well-known fact that "fires" can be caused by contact of sodium dithionite with water, a combination which liberates heat. Where large quantities are confined, in drums or storage bins, sufficient heat can accumulate to reach a temperature, even with small amounts of water, to start the decomposition reaction. An explosion can occur from the internal pressure generated by the decomposition when a gas-tight storage container such as a drum is involved. Although precautions are generally taken to keep sodium dithionite dry, moisture from the air, residual moisture from the manufacturing process, or water from accidental wetting of the stored material may initiate the decomposition reaction under certain conditions.

It has been reported that sodium dithionite decomposes and "burns" with or without the presence of moisture if the temperature is allowed to reach 135°–190° C. Presently accepted stabilizers such as alkali metal carboxylates (e.g., sodium benzoate) and water-soluble macro-molecules (e.g., polyethyleneimine) prevent the temperature from reaching these heights.

Known art in this field comprises the following:
A. R.C. Franklin and H.I. Stryker, U.S. Pat. No. 3,054,658 (1962) to E.I. DuPont de Nemours and Co.
B. F. Poschmann and A. Janson, U.S. Pat. No. 3,287,276 (1966) to BASF.

DESCRIPTION OF THE PREFERRED EMBODIMENTS

In concentrations ranging from 0.5 to 20.0 percent by weight relative to an overall bleaching additive product of the sodium dithionite, disodium, dipotassium and diammonium diglycolate salts, have been found effective as stabilizers against self-ignition of the dry sodium dithionite when it has been contacted with moisture. In all cases herein, the grades of sodium dithionite and the diglycolate salts are within these minimums:

In the presence of 10.0 percent sodium carbonate, the blend may be protected with a 2.5 percent disodium diglycolate. Under laboratory conditions, the non-protected commercial sample of sodium dithionite reached 306° C. in 2 hours with the appearance of a flame over the surface (Table I). With 5.0 percent disodium diglycolate, the temperature reached only 133° C. in 2 hours, a temperature below the thermal decomposition point of sodium dithionite. Increasing amounts of the disodium salts improved the protection. In point of fact, where 10 percent sodium carbonate was used with a 2.5 percent disodium diglycolate, the sodium dithionite was protected against self-ignition, whereas the unprotected standard having sodium carbonate alone reached a temperature of 250° C. after 2 hours.

Again, and without the sodium carbonate being added, the dipotassium salt gave evidence of protection at the 20.0 percent dipotassium diglycolate level and the diammonium salt provided protection at the 15.0 percent concentration level, all as will appear from reference to ensuing Table I.

Testing Procedure:

A 500 ml. Dewar flask (inside diameter 77 mm; depth 125 mm) was charged with 200 g. of the sodium dithionite test sample. 12 milliliters (12 ml.) of water were then pipeted rapidly around a thermocouple positioned at the center of the test sample. An additional 200 g. of sample were immediately poured on top of the initial portion and the subsequent temperature rise recorded every 2 minutes throughout the 2 hour test period.

TABLE I

Sodium Hydrosulfite Self-Ignition Tests[1] With Salts of Diglycolic Acid

| Blend | $Na_2S_2O_4$ Wt. % | $Na_5P_3O_{10}$ Wt.% | $Na_2CO_3$ Wt. % | SODA[2] Wt.% | KODA[3] Wt.% | AODA[4] Wt.% | Temp.(°C.) after 2 hours |
|---|---|---|---|---|---|---|---|
| 789-79-1 | 100.0 | | | | | | 306 |
| 789-81-1 | 99.5 | | | 0.5 | | | 293 |
| 789-81-2 | 99.0 | | | 1.0 | | | 285 |
| 789-155-5 | 97.0 | | | 3.0 | | | 267 |
| 789-79-2 | 95.0 | | | 5.0 | | | 133 |
| 789-79-3 | 90.0 | | | 10.0 | | | 66 |
| 789-85-1 | 80.0 | | | 20.0 | | | 55 |
| 789-85-3 | 90.0 | | 10.0 | | | | 250 |
| 789-155-4 | 87.5 | | 10.0 | 2.5 | | | 81 |
| 789-79-5 | 85.0 | | 10.0 | 5.0 | | | 45 |
| 789-85-2 | 80.0 | | 10.0 | 10.0 | | | 33 |
| 789-155-1 | 90.0 | 10.0 | | | | | 133 |
| 789-79-4 | 85.0 | 10.0 | 5.0 | | | | 122 |
| 789-79-6 | 80.0 | 10.0 | 10.0 | | | | 77 |
| 789-155-6 | 97.0 | | | | 3.0 | | 269 |
| 789-155-7 | 95.0 | | | | 5.0 | | 244 |
| 789-85-5 | 90.0 | | | | 10.0 | | 230 |
| 789-85-4 | 80.0 | | | | 20.0 | | 60 |
| 789-155-8 | 95.0 | | | | | 5.0 | 247 |
| 789-85-6 | 85.0 | | | | | 15.0 | 69 |

[1] $Na_2S_2O_4$ blend was treated with 3% by weight of water in a Dewar flask. The water was placed in the middle of the blend.
[2] Disodium diglycolate.
[3] Dipotassium diglycolate.
[4] Diammonium diglycolate.

We claim:

1. A method of retarding self-ignition in dry storage of commercial grades of sodium dithionite, comprising adding to the sodium dithionite, precedent to storage, small but effective amounts of the groups alkali metal and ammonium salts of diglycolic acid.

2. The method according to claim 1 in which the salt comprises disodium diglycolate.

3. The method according to claim 1 in which the salt comprises dipotassium diglycolate.

4. The method according to claim 1 in which the salt comprises diammonium diglycolate.

5. The method according to claim 1 wherein the amount of additive salt is less than the sodium dithionite, the concentration of the additive salt being in concentration of 2.5 to 20.0 percent by weight relative to the overall product of sodium dithionite to be stored.

6. The method according to claim 2 in which the concentration of the sodium diglycolate is at 0.5 to 20.0 percent relative to the overall product of sodium dithionite to be stored.

7. The method according to claim 3 wherein the dipotassium diglycolate is at a concentration of 3.0 to 20.0 percent, relative to the overall product of sodium dithionite to be stored.

8. The method according to claim 4 in which the ammonium diglycolate is at the concentration of 5.0 to 15.0 percent relative to the overall product of sodium dithionite to be stored.

9. The method according to claim 2 wherein sodium carbonate is added in a concentration of 10.0 percent, relative to the overall product of sodium dithionite to be stored and the disodium diglycolate is in a concentration range of 2.5 to 10.0 percent relative to said sodium dithionite.

10. A bleaching agent composition of matter comprising in relative percentages by weight, the compounds:
   A. dry sodium dithionite 80.0 to 99.5 percent;
   B. the group alkali metal and ammonium salts of diglycolic acid 20 to 0.5 percent.

11. A bleaching agent composition of matter comprising in relative percentages by weight, the following:
   A. dry sodium dithionite 99.5 to 80.0 percent;
   B. disodium diglycolate 0.5 to 20.0 percent.

12. A bleaching agent composition of matter comprising the following:
   A. dry sodium dithionite 87.5 to 80.0 percent by weight;
   B. 10.0 percent by weight of sodium carbonate;
   C. 2.5 – 10.0 percent disodium diglycolate.

13. A composition of matter bleaching agent comprising in percentage by weight:
   A. dry sodium dithionite at 97.0 – 80.0 percent commercial grade sodium dithionite;
   B. 3.0 – 20.0 percent dipotassium diglycolate.

14. A composition of matter bleaching agent comprising in percentage by weight:
   A. 95.0 – 85.0 percent sodium dithionite;
   B. ammonium diglycolate 5.0 – 15.0 percent by weight.

* * * * *